No. 739,927. Patented September 29, 1903.

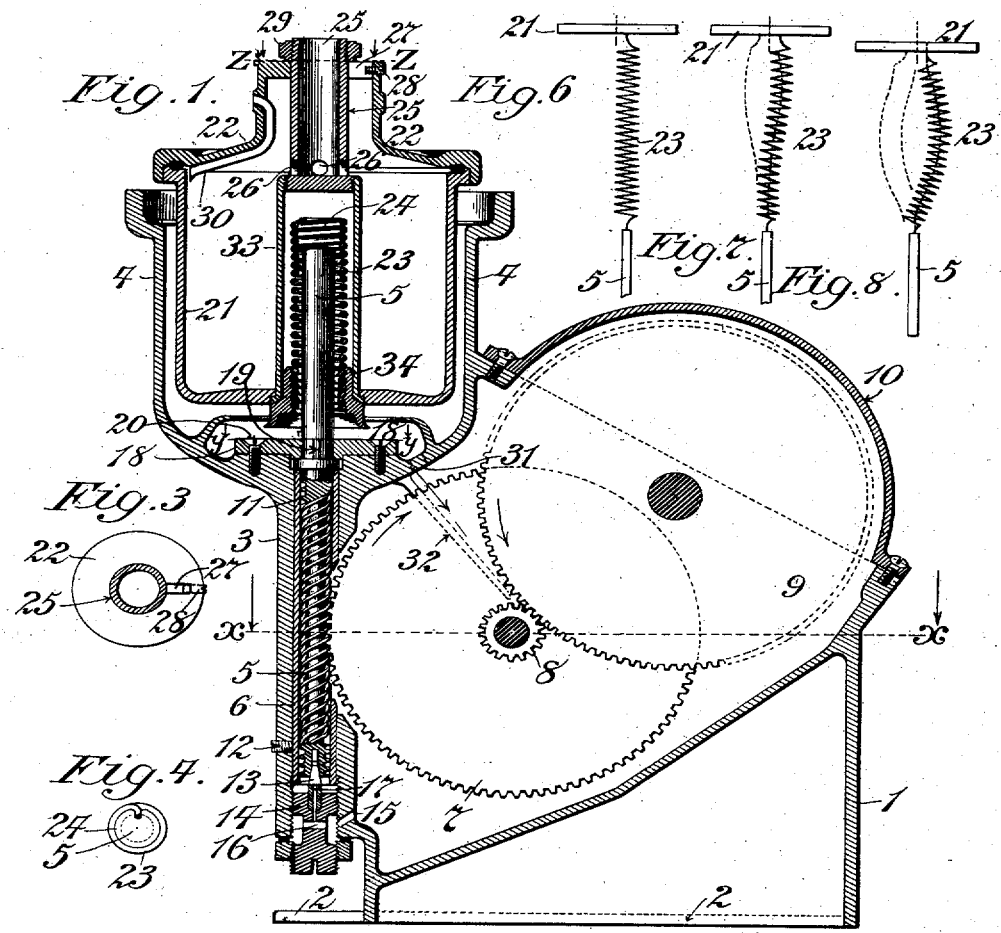

UNITED STATES PATENT OFFICE.

GUSTAF RENNERFELT, OF BROOKLYN, NEW YORK, ASSIGNOR TO KOCHKUM, JR., & OHLSSON, OF NEW YORK, N. Y., A FIRM.

CENTRIFUGAL LIQUID-SEPARATOR.

SPECIFICATION forming part of Letters Patent No. 739,927, dated September 29, 1903.

Application filed September 13, 1902. Serial No. 123,230. (No model.)

*To all whom it may concern:*

Be it known that I, GUSTAF RENNERFELT, a subject of the King of Sweden and Norway, residing at New York, borough of Brooklyn, county of Kings, and State of New York, have made a new and useful Invention in Centrifugal Liquid-Separators, of which the following is a specification.

My invention relates to improvements in centrifugal liquid-separators where separation of liquids of different specific gravities is effected in a rapidly-rotating bowl or vessel in which the heavier liquid is thrown to the periphery of the bowl and the lighter one is drawn toward the axial center thereof. As such sepa.tors are ordinarily constructed it is necessary to balance the bowl in a very careful manner, so that its center of gravity will be located exactly in the axis of rotation, which is determined by the bearings in which rotates the shaft that supports the bowl. This balancing of the bowl is usually effected by soldering some tin to the lighter side thereof until by repeated testing it is found to run sufficiently true to avoid vibration. On cream-separators such balancing is generally performed three times: first, on the empty bowl or vessel; second, on the bowl with the supported dividing-disks, and, third, with the complete bowl and supported dividing-disks after the bowl is filled with water or milk. This balancing is a very expensive operation, and it may have to be repeated, since by careless handling accurate balancing is apt to be destroyed. Such a method of balancing requires a high degree of workmanship, so that the bowl must necessarily be returned to the factory, thus causing interruption in the running of the dairy and inconvenience to the dairy owner. If the bowl is not well balanced, it is impossible to bring it up to the necessary high speed without causing vibrations, which will interfere with or prevent a proper separation of the liquids and which may even be detrimental to the strength of the machine.

The principal object of my invention is to construct a liquid-separator in which the separating bowl or vessel is practically self-balancing at all speeds of rotation, thereby obviating the necessity of a careful mechanical balancing, as is usually done.

For a full and clear understanding of my invention, such as will enable others skilled in the art to construct and use the same, reference is had to the accompanying drawings, the especial points of novelty being particularly pointed out in the claims at the end of the specification.

Figure 1 represents a sectional view taken through the body of the machine, parts of the driving mechanism being shown in elevation. Fig. 2 is a transverse sectional view taken on the line $x\,x$, Fig. 1, and as seen looking thereat from the top toward the bottom of the drawing in the direction of the arrows. Fig. 3 is a transverse sectional view taken through Fig. 1 on the line Z Z and as seen looking thereat from the top toward the bottom of the drawing in the direction of the arrows. Fig. 4 is a plan view illustrating the preferred manner of attaching the yielding means of support for the bowl to the rotary driving-shaft. Fig. 5 is a transverse sectional view taken on the line $y\,y$, Fig. 1, and as seen looking thereat from the top toward the bottom of the drawing in the direction of the arrows. Figs. 6, 7, and 8 are diagrammatic views illustrating the application of the essential principle utilized in my invention when in practical operation.

I have discovered that if a body, as a bowl or vessel, utilized in the separation of liquids of different specific gravities be yieldingly supported by a rotary shaft in such manner that the bowl will be rotated with the shaft the center of gravity of the same and its contained liquid and also of the yielding support will for high speeds of rotation assume a position located in the axial line of the rotary shaft, and in the application of this generic principle lies the essence of my invention, for that it makes it possible to avoid artificial balancing of the bowl and attached parts of the apparatus, whereby a separator is produced which does not require extreme care in use and need not be returned to the builder or to an expert for effecting the proper balancing of the parts.

Referring first to Figs. 6, 7, and 8, I have illustrated therein diagrammatically the essential principle of my invention. In all of these figures of the drawings 5 represents a rotatable shaft, 23 a flexible or yielding spring rigidly secured to the shaft, and 21 a mass, as a bowl or vessel, rigidly secured to the free end of the spring. I have illustrated in these figures of the drawings the bowl or mass 21 as being eccentrically mounted with relation to the axis of the spring and the axis of the rotatable shaft, this for the purpose of showing how it is possible to rotate the bowl or mass 21 and the yielding supporting-spring 23 in such manner that the center of gravity of the united masses shall be located in the axial line of the rotatable shaft 5. Fig. 7 illustrates the parts in rotation at moderate speeds, in which it will be noted the centers of gravity of the bowl or mass 21 are directly in alinement with the axis of the shaft 5 and the yielding spring-support 23 assumes a curved position, while in Fig. 8 the several masses are shown as being rotated at much higher speeds, the spring assuming a greater curved position.

In diagrams 7 and 8 the common center of gravity of the mass of the bowl and the spring is at all times located in alinement with the axis of the rotatable shaft 5. It will be noted also that the supporting-spring 23 is of spiral form, this being an important feature in that it prevents damaging shocks to the step-bearing when the bowl is being filled or put in place.

Referring now to Figs. 1 to 5, inclusive, for a description of the complete machine, 1 represents a frame of cast metal, having a base-flange 2 adapted to secure it to a table, a bench, or the floor, said frame being so cast, as clearly illustrated in Figs. 1 and 2, as to constitute the support for a train of gear-wheels 7 8 9 and to surround the same in such manner as to act as a retaining vessel for a lubricating-oil, 10 being a detachable cover for the train of gear-wheels. 3 is a standard, and 4 a liquid-containing cup cast also integral with the frame 1. 5 is a rotary shaft provided with a worm 11, meshing with the gear-wheel 7 and journaled in a Babbitt-metal or bronze sleeve 6, held in place within the standard 3 by one or more set-screws 12. The lower end of the shaft 5 is provided with a step-bearing, made adjustable by means of a screw-plug 14, secured in the frame, as clearly shown, and the upper end of said shaft is provided with a head 24, having a screw-thread cut upon its exterior surface of the same pitch as the spirals of the strong-steel coil supporting-spring 23. The middle portion of the shaft is provided with a shoulder, which is held in position in the bottom of the cup 4 against upward thrust by a two-part disk 18 18 and screws 20 20, said disks constituting a thrust-bearing and being notched on their adjoining faces at 19 19 for the purpose of admitting of the circulation of the lubricating-oil and the return thereof to the chamber which supports the driving gear-wheels 7 8 9, the latter being connected to an operating crank or pulley. (Not shown.) 15, 16, and 17 are oil-holes for admitting of the passage of the lubricant from the oil-chamber upward to the step-bearing 13 and lower end of the worm 11 of the shaft 5. 31 is an oil-hole for admitting of the return of the oil to the oil-chamber, and 32 is a guide-spout for conveying the same directly to the shaft of the gear-wheel 8. 21 is the separating bowl or vessel, which is provided with an opening in the center of its bottom adapted to fit snugly about a vertically-disposed tube 33, the lower end of which in turn rests upon the outer coned face of a support 34, which in turn is secured to the lower end of the strong spiral spring 23, the upper end of said spring being secured, as is clearly illustrated in Fig. 4, directly to the enlarged head 24 of the upper end of the shaft 5 by turning the free end of the spring inward and locking it in a hole or slot in said head. 25 is a filling-tube for the bowl 21, having a base part screw-threaded into the upper end of the tube 33, and inlet-openings 26 26 26 26 are provided for admitting the combined liquids to be separated to the interior of the bowl or vessel. 22 is a cover for the bowl or vessel, a yielding washer being provided for making a liquid-tight joint between the same and the vessel. 29 is a nut adapted to lock all of the parts securely together. 27 is the usual slot in the upper end of the cover for admitting of the passage of the lighter liquid outward when the machine is in operation, 28 being an adjustable screw for varying the dimensions of said slot. 30 is a similar outlet for the liquid of greater specific gravity, said outlet being secured directly to the inner surface of the lid or cover 22 and as is usual in such machines.

The operation of the machine is obvious to those skilled in the art, it being apparent that on rotating the train of gear-wheels, so that the main driving gear-wheel 7 rotates from left to right, as indicated by the curved arrow, an upward thrust is given to the worm 11 and shaft 5, the bowl or vessel 21 being rotated in a manner well understood, the flexible nature of the supporting-spring 23 being such that the combined centers of gravity of the bowl, its contents, and of the supporting-spring will remain for high speeds of rotation in the axis of the rotatable shaft 5, the process of the separation of the liquids of different specific gravities being identically the same as in similar machines and well understood.

It will be apparent that by reason of the free circulation of the lubricant through the openings 15, 16, and 17 the lower step-bearing 13 is at all times perfectly lubricated, while the relations of the worm 11 and its surrounding journal-sleeve 6 is such that the lubricant is continuously advanced to the upper thrust-bearing and ultimately passes upward through the openings 19 and finally again downward through the opening 31 and guide-spout 32 to the shaft of the driving gear-wheel 7, the entire arrangement being such that the lubricant is in continuous circulation. It will also be apparent that the lower step-bearing 13 may be readily removed by withdrawing the screw-plug 14 and releasing the set-nut and its adjacent washer, which makes an oil-tight joint between the screw-plug and the bottom of the chamber in which said plug is secured.

I do not limit my invention to the especial details of construction illustrated in the accompanying drawings. I believe it is broadly new with me to devise a centrifugal separator in which the separating bowl or vessel and its attached parts are wholly supported by flexible means attached to the end of a rotatable shaft and in such manner that the common centers of gravity of all the combined parts will always remain in the axis of the rotatable shaft for high speeds of rotation, and in the application of this generic principle lies the most essential feature of my invention.

I am aware that prior to my invention a non-liquid centrifugal separator had been devised in which the bowl is yieldingly supported by a shaft at a point between the journal-bearings thereof, the arrangement being such that the bowl is a fixture upon the shaft and cannot be detached therefrom without dismantling the machine, as disclosed in United States patent to Fletcher, No. 335,690, granted February 9, 1886, and I make no claim hereinafter broad enough to include such a structure. With the arrangement disclosed in the accompanying drawings and hereinbefore described I am enabled to continuously supply the material to be separated during the operation of the machine and to deliver the same into the bowl through a central opening at the top thereof, the attachment of the bowl to the outer or free end of the shaft making it possible also to remove it at any time for the purpose of cleansing or repairing it or substituting a different bowl therefor, and my claims are generic as to these features.

Having thus described my invention, what I claim, and desire to secure by Letters Patent of the United States, is—

1. A centrifugal separator provided with a separating-bowl wholly yieldingly supported by means carried by one end of a shaft rotating in a rigid bearing, substantially as described.

2. A centrifugal separator having a bowl operatively attached to one end of a rotatable shaft by yielding means adapted to yield both in vertical and lateral directions, said shaft being supported by and rotating in a rigid bearing, substantially as described.

3. In a centrifugal separator a bowl operatively attached to one end of a spiral spring, the other end of which is directly attached to a rotatable shaft, said spring constituting the entire means of support for the bowl, substantially as described.

4. In a centrifugal separator a bowl operatively connected to one end of a rotatable shaft by yielding means only; said rotatable shaft being provided with end or thrust bearings, substantially as described.

5. In a centrifugal separator the combination of a driving-shaft rotating in a rigid bearing and a bowl with laterally-yielding means interposed between the free or outer end of said shaft and the bowl, the same constituting the sole means of support for the bowl, substantially as described.

6. In a centrifugal separator the combination of a bowl supported at one end of a rotatable shaft by vertical yielding supporting means interposed between the bowl and the bearing of the shaft for the purpose of lessening the strain thereon, substantially as described.

7. In a centrifugal separator the combination of a bowl detachably connected to a support which support is in turn yieldingly connected to one end of a rotatable shaft, rotating in a rigid bearing substantially as described.

8. In a centrifugal separator a spring, a bowl attached to one end of said spring, the other end of which is rigidly secured to a shaft, substantially as described.

9. In a centrifugal separator a bowl, a spiral spring secured at one end to said bowl and at the other end to a rotatable shaft, substantially as described.

10. In a centrifugal separator a bowl secured to the lower end of a spiral spring, the upper end of said spring being secured to a rotatable shaft at a point above the center of gravity of the bowl and its attached parts, substantially as described.

11. In a centrifugal separator the combination of a rotatable shaft, a spring secured to said shaft and a sleeve or tube attached to the spring; in combination with a bowl adapted to be carried by the sleeve or tube, substantially as described.

12. In a centrifugal separator, a rotatable driving-shaft screw-threaded at one end; in combination with a spiral spring secured directly to the screw-threads of the shaft; together with a bowl secured to the other end of the spring, substantially as described.

13. In a centrifugal separator a spring, a bowl secured through friction to one end of said spring, the other end of which is secured to a driving-shaft rotating in a rigid bearing, substantially as described.

14. A centrifugal separator provided with a separating-bowl operatively connected to one end of a rotatable shaft by yielding means only; said rotatable shaft being operatively connected to rigidly-journaled driving mechanism, substantially as described.

15. A centrifugal separator detachably secured by yielding means to one end of a rotatable shaft journaled in a rigid journal-bearing, substantially as described.

16. A centrifugal separator provided with a separating-bowl having the inlet for the liquid located at its top and being operatively attached to one end of a rotatable shaft by yielding means, substantially as described.

In testimony whereof I have signed my name to this specification in the presence of two subscribing witnesses.

GUSTAF RENNERFELT.

Witnesses:
C. J. KINTNER,
ABRAHAM OHLSSON.

Correction in Letters Patent No. 739,927.

It is hereby certified that the name of the first-mentioned member of the firm of assignees in Letters Patent No. 739,927, granted September 29, 1903, upon the application of Gustaf Rennerfelt, of Brooklyn, New York, for an improvement in "Centrifugal Liquid-Separators," was erroneously written and printed "Kochkum, jr.," whereas the said name should have been written and printed *Kockum, jr.;* and that the said Letters Patent should be read with this correction therein that the same may conform to the record of the case in the Patent Office.

Signed and sealed this 13th day of October, A. D., 1903.

[SEAL.]

F. I. ALLEN,
*Commissioner of Patents.* cured by yielding means to one end of a rotatable shaft journaled in a rigid journal-bearing, substantially as described.

16. A centrifugal separator provided with a separating-bowl having the inlet for the liquid located at its top and being operatively attached to one end of a rotatable shaft by yielding means, substantially as described.

In testimony whereof I have signed my name to this specification in the presence of two subscribing witnesses.

GUSTAF RENNERFELT.

Witnesses:
C. J. KINTNER,
ABRAHAM OHLSSON.

Correction in Letters Patent No. 739,927.

It is hereby certified that the name of the first-mentioned member of the firm of assignees in Letters Patent No. 739,927, granted September 29, 1903, upon the application of Gustaf Rennerfelt, of Brooklyn, New York, for an improvement in "Centrifugal Liquid-Separators," was erroneously written and printed "Kochkum, jr.," whereas the said name should have been written and printed *Kockum, jr.;* and that the said Letters Patent should be read with this correction therein that the same may conform to the record of the case in the Patent Office.

Signed and sealed this 13th day of October, A. D., 1903.

[SEAL.]

F. I. ALLEN,
*Commissioner of Patents.*

It is hereby certified that the name of the first-mentioned member of the firm of assignees in Letters Patent No. 739,927, granted September 29, 1903, upon the application of Gustaf Rennerfelt, of Brooklyn, New York, for an improvement in "Centrifugal Liquid-Separators," was erroneously written and printed "Kochkum, jr.," whereas the said name should have been written and printed *Kockum, jr.;* and that the said Letters Patent should be read with this correction therein that the same may conform to the record of the case in the Patent Office.

Signed and sealed this 13th day of October, A. D., 1903.

[SEAL.]

F. I. ALLEN,
*Commissioner of Patents.*